(No Model.)
L. J. WILDE.
ELASTIC TUBULAR TIRE.
No. 572,738. Patented Dec. 8, 1896.
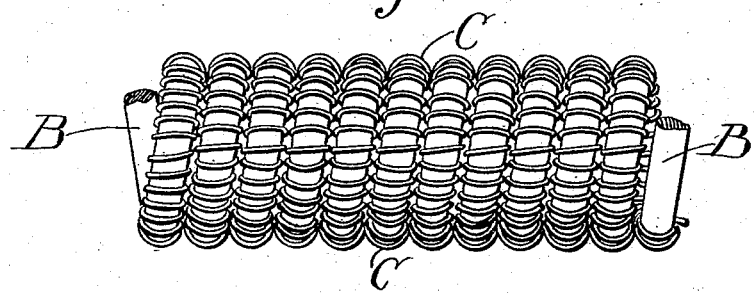
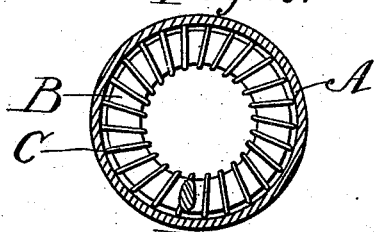
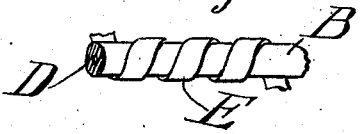
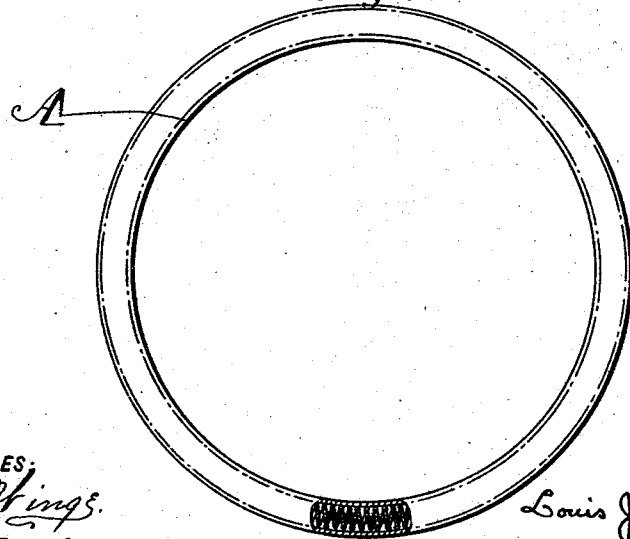
WITNESSES:
INVENTOR
Louis John Wilde
BY
ATTORNEYS

UNITED STATES PATENT OFFICE.

LOUIS JOHN WILDE, OF NEW YORK, N. Y., ASSIGNOR OF ONE-HALF TO MAURICE SALVIN, OF SAME PLACE.

ELASTIC TUBULAR TIRE.

SPECIFICATION forming part of Letters Patent No. 572,738, dated December 8, 1896.

Application filed May 5, 1896. Serial No. 590,335. (No model.)

*To all whom it may concern:*

Be it known that I, LOUIS JOHN WILDE, a citizen of the United States, and a resident of New York city, county of New York, and State of New York, have invented certain new and useful Improvements in Elastic Tubular Tires, of which the following is a specification, reference being had to the accompanying drawings, forming a part thereof, in which similar letters of reference indicate corresponding parts.

This invention relates to a new and useful improvement in elastic tubular tires for bicycle or other wheels, and has for its object to provide a tire that will afford the elasticity of a pneumatic tire, but without its disadvantages, and which will not add too much weight to the wheel or be too expensive in manufacture.

The invention will be hereinafter fully described, and specifically set forth in the annexed claims.

In the accompanying drawings, forming part of this specification, Figure 1 is a side elevation of a portion of the coil used in my tire. Fig. 2 is a vertical cross-section of a tire, showing the device applied. Fig. 3 is a side elevation of a tire with a portion in section, showing application of the coil used in the device; and Fig. 4 is a side elevation showing a modification of structure of the core and wire hereinafter explained.

In the practice of my invention there is provided, primarily, a solid cylindrical core B, of flexible material, preferably rubber, upon which core B is loosely and spirally wound a fine resilient metallic wire C. This said wire is preferably japanned to prevent rusting. There is then formed a compound coil, as shown in Fig. 1, by winding the said core B, spirally inclosed by wire C, upon a mandrel of suitable size, so that the compound coil so formed shall be adapted to fit snugly within the tubular tire A.

I prefer to have the diameter of the flexible core B somewhat less than one-fifth that of the compound coil; but it may be of any size preferred. The wire C may also be wound so as to give the spirals a more distended pitch than is shown by Fig. 1 of the drawings.

It is obvious than any pressure upon the tread of the tubular casing A of the tire will be met by the counter resiliency of the inclosed compound coil, and that the pressure at the point of contact will be distributed along a considerable length of the coil, thus making my device equal to a pneumatic tire, besides exempting it from liability of becoming useless from puncture. The casing A can by the use of my device be made much thinner and consequently lighter than in tubular tires as ordinarily made, and such casing can be renewed when worn out, using the same compound interior coil.

In Fig. 4 is shown a modification of my device, in which the core B is provided with a central longitudinal aperture D and spirally wound with flat instead of round wire E, thus adapting the use of the compound coil to very thin tires without danger of abrasion or damage from the inclosed coil.

Having thus described my invention, what I claim as new, and desire to secure by Letters Patent, is—

1. As a new article of manufacture, an elastic tubular tire comprising a tire having fitted therein a compound coil composed of a solid cylindrical flexible core spirally wound with resilient wire and the core thus wound formed into a spiral coil adapted to fit within the tubing, substantially as shown and described.

2. In an elastic tire, the combination of an elastic tube; and a cylindrical flexible core spirally and loosely wound with resilient metal wire and formed into a secondary or compound coil adapted to be placed within and constitute a resilient core to said elastic tube, substantially as shown and described.

3. In an elastic tire, the combination of an elastic tube; and a flexible core with apertured center, said core spirally and loosely wound with flat resilient wire and the said core so wound formed into a secondary spiral coil adapted to fit within said elastic tubing, substantially as shown and described.

4. In an improved tire, the combination of an elastic tube A, and a compound coil comprising a cylindrical flexible core B, spirally wound with wire C, and then re-coiled, said compound coil adapted to fit within the elastic tubing A, substantially as shown and described.

In testimony that I claim the foregoing as my invention I have signed my name, in presence of two witnesses, this 2d day of May, 1896.

LOUIS JOHN WILDE.

Witnesses:
O. C. WINGE,
W. W. HILL.